United States Patent
Banks et al.

(10) Patent No.: US 6,747,979 B1
(45) Date of Patent: Jun. 8, 2004

(54) METHOD AND APPARATUS FOR BRIDGING BETWEEN NETWORKS

(75) Inventors: David Banks, Bristol (GB); Duncan Smith, Bristol (GB); Anthony John Wiley, Bristol (GB)

(73) Assignee: Hewlett-Packard Development Company, L.C., Houston, TX (US)

( * ) Notice: Subject to any disclaimer, the term of this patent is extended or adjusted under 35 U.S.C. 154(b) by 0 days.

(21) Appl. No.: 09/427,705

(22) Filed: Oct. 27, 1999

(30) Foreign Application Priority Data

Oct. 27, 1998 (EP) .............................. 98308798

(51) Int. Cl.[7] .............................................. H04L 12/56
(52) U.S. Cl. ...................................................... 370/401
(58) Field of Search ................................ 370/391, 392, 370/401, 402, 465, 466

(56) References Cited

U.S. PATENT DOCUMENTS

| | | | |
|---|---|---|---|
| 5,432,907 A | | 7/1995 | Picazo, Jr. et al. |
| 5,724,517 A | * | 3/1998 | Cook et al. .................. 709/227 |
| 5,978,854 A | * | 11/1999 | Fujimori et al. ............ 709/245 |
| 6,081,533 A | * | 6/2000 | Laubach et al. ............ 370/421 |
| 6,219,697 B1 | * | 4/2001 | Lawande et al. ........... 709/221 |
| 6,324,178 B1 | * | 11/2001 | Lo et al. ...................... 370/392 |

FOREIGN PATENT DOCUMENTS

| | | |
|---|---|---|
| EP | 0465201 A2 | 1/1992 |
| EP | 0556148 A1 | 8/1993 |
| JP | 08187047 | 2/1998 |
| WO | 98/26533 | 6/1998 |

OTHER PUBLICATIONS

Perlman, R., *Interconnections: Bridges and Routers*, pp. 54–73. Addison–Wesley Publishing Company (Reading, MA. 1992). Network Working Group, J. Postel, ISI, "Multi–Lan Address Resolution," Oct., 1984.

"IPv4 Over IEEE 1394," Internet Draft, Network Working Group, P. Johansson, Congruent Software, Inc., Aug. 1998.

* cited by examiner

*Primary Examiner*—Wellington Chin
*Assistant Examiner*—William Schultz

(57) ABSTRACT

A network layer bridge includes: plurality of ports for connection to different network segments, a first port and a second port for connection to respective first and second network segments; a memory for storing network layer addresses for nodes with corresponding port identifiers and data link layer addresses, and data link layer addresses of more than one type; and a unit for discovering corresponding port identifier and data link layer address for a network layer address. The bridge forwards a message from a first node to a second node when corresponding port identifiers and data link level addresses for both first and second nodes are stored in the memory; the message being addressed with the network layer address of the second node, and the network layer bridge directing the message through the corresponding port to the corresponding data link level address for the second node.

29 Claims, 6 Drawing Sheets

Node A ⟶ Bridge (Port 0)

Bridge (Port 1) ⟶ Node B

METHOD AND APPARATUS FOR BRIDGING BETWEEN NETWORKS

BACKGROUND OF THE INVENTION

1. Field of the Invention

The invention relates to a method and apparatus for bridging between networks. More particularly, the invention relates to a method and apparatus for connecting computer networks of dissimilar types.

2. Description of the Related Art

This text refers to IEEE standards, Requests for Comments (RFCs) and Internet-Drafts. These are all standard sources in the networking field. IEEE standards are published by the Institute of Electrical and Electronics Engineers, Inc., 345 East 47$^{th}$ Street, New York, N.Y. 10017, USA. RFCs are a series of notes about the Internet, and include the specification documents of protocols associated with the Internet as these are defined by the Internet Engineering Task Force (IETF). RFCs are published by the Information Sciences Institute (ISI) of the University of Southern California (USC). Internet-Drafts are working documents of the Internet Engineering Task Force (IETE) and its working groups (and of certain other bodies) and may form the basis for later RFCs. Internet-Drafts are draft documents valid for a maximum of six months and may be updated, replaced, or obsoleted by other documents at any time. Both RFCs and current Internet-Drafts are obtainable through the World Wide Web site of the IETF, http://www.ietf org/.

Computer networking is complex, and for practical tractability is divided into a number of subtasks. Conventionally, a network is divided into layers, with each layer being responsible for providing a service to the layer above it, the layer itself calling on the services of the layer below it.

The generally accepted model for networking is the OSI (Open Systems Interconnection) Reference Model defined by ISO. This defines seven layers, as are illustrated in FIG. 1. Each layer 1 at a node 4 communicates with its peer layer 1 at another node through the use of a protocol 2. Such communication is accomplished through direct communication with the layer below. The communication 3 between overlying layers is known as an interface.

The layers as defined in the OSI are as follows.

Physical Layer

This operates to transmit unstructured bits of information across a link. It is relevant to similar fundamental structural arrangements such as connector type and identification of the purpose of different wires in a cable.

Data Link Layer

This operates to transmit basic structural blocks of information across a link. This is the critical layer for communication within a local area network (LAN), and deals with addressing within a LAN, for example. A sublayer of the data link layer is the medium access control (MAC) layer, which addresses issues specific to a particular type of LAN.

Network Layer

This operates so as to enable any pair of systems in the network to communicate with each other. The dominant network layer protocol is the Internet Protocol (IP). The network layer is responsible for issues such as route calculation and packet fragmentation and reassembly.

Transport Layer

This operates to achieve a reliable communication stream between two systems. The transport layer deals with issues such as lost packets and packet reordering.

Session Layer, Presentation Layer, Application Layer

These are used for higher level services (particular communication patterns, data representations, standardisation of applications) and are not relevant to the communication issues under consideration here.

Communication within a single LAN is handled by the data link layer. A basic problem in networking is communication between two or more LANs, or between a LAN and a network backbone. If two LANs to be connected together are of the same type or sufficiently similar and share the same MAC level addressing, then a bridge can be used to link the LANs together. A bridge is a device which connects two LANs (or, rather, nodes on two LANs) at the level of the data link layer. IEEE 802.1d is a standard defining such bridges (termed "transparent" bridges, because nodes on the network are unaware of the existence of such bridges, the nodes "seeing" other nodes directly across the bridge)—bridges not conforming to the IEEE 802.1d can of course be constructed, but are not standard network components. The operation of a basic bridge is described below with reference to FIG. 2.

The bridge 21 connects two LAN segments 22, 23, accessing each segment via a separate port 25, 26. Each LAN segment has a number of nodes 24. The bridge 21 listens to every packet transmitted on either of the LAN segments 22 and 23. For each packet received, the bridge stores the MAC address in the packet's source address field in a cache, together with the port on which the packet is received. The bridge 21 then looks through its cache to find the MAC address in the packet's destination address field. If the destination address is not found in the cache, the packet is forwarded out through all the ports except the one on which it was received. If the destination address is found in the cache, the packet is forwarded only through the appropriate port—however, if the "appropriate port" is the one on which the packet was received (meaning that the packet was for transmission between nodes on a single LAN segment), the packet is dropped.

The effect of this functionality is that the bridge can learn MAC addresses, and does not require configuration. For example, consider that bridge 21 has just been put into place, without knowledge of any node addresses. Say that the first packet sent is from node A to node B. This packet will be received by the bridge 21 through the port 25. The bridge 21 will then store in its cache the MAC address of node A, which is in the source address field of the packet, together with the datum that this address is accessible through the port leading to LAN segment 22. The packet will then be forwarded on all other ports (in this case, the port 26 leading to LAN segment 23), as the bridge will have no record of the address of node B in its cache—in this case, this communication is unnecessary for receipt by node B, as node B is on the same LAN, segment as node A. Say that the next packet is sent by node D to node A. The packet will be received by the bridge 21 through the port 26 corresponding to LAN segment 23, and the MAC address of node D and the datum that this address is accessible through the port 26 leading to LAN segment 23 are recorded in the bridge cache. The destination address, that of node A, is already in the bridge cache. The bridge 21 will thus transmit the packet out through the port 25 connecting to LAN segment 22, and would not transmit it through any other port. If the next packet is from node B to node A, the bridge 21 will capture the relevant data for node B in the cache—it will also know from the cache that node B and node A are on the same LAN segment 22, and hence will not forward the packet at all.

The bridge has considerable advantages: it requires (in its basic operation) no configuration, as it can operate immediately and learn the information it requires to operate with full efficiency, and it is transparent to the nodes (in that the node does not perceive any difference between communication on its own LAN segment and communication through the bridge to another LAN segment). Such a bridge does however rely for its operation on similar MAC level addressing on each LAN segment, as otherwise messages forwarded across the bridge will be unintelligible. Many types of bridge design have been proposed, though alternative designs differing from that described above do not fall within the IEEE 802.1d standard. One particular design was proposed in RFC 925 by J. Postel of ISI. The RFC 925 scheme proposes bridging between LAN segments, but storing Internet (IP) addresses, rather than simply MAC level addresses, in the bridge and using network layer protocols to effect bridging. A conventional bridge is a more effective choice than an RFC 925 bridge for connecting LAN segments of similar type locally because use of a network protocol introduces additional complexity and because an IEEE 802.1d bridge can easily be implemented in hardware alone: for more complex networks, the effective choice was found to be routing (as discussed below). The RFC 925 scheme has in consequence not been applied in any standard.

Where the LAN segments are of different network types (or where the network is complex), the current general approach is to connect at the network layer level, rather than at the data link layer level. This is done by means of a router. Connection between LAN segments of different types using a router is shown in FIG. 3.

FIG. 3 shows connection of LAN segments 32, 33 of different network types by means of a router 31. Each LAN segment has a number of nodes 34. At the network layer, the protocol most commonly used is Internet Protocol (IP). Each node 34 has an IP address. An IP address has two parts: a network component and a host component. Each node on a LAN needs to have the same network component: consequently nodes A and B have the same network component "2". The router 31 also needs to have an IP address for it to be able to send and receive messages, and for the router 31 to communicate as part of LAN 32, it needs to have an address with the same network component as the nodes in LAN 32. However, the router 31 also needs to communicate as a node on LAN 33, so it needs a further IP address with network component "3"—the network component for all nodes on LAN 33. The router 31 hence needs to be configured with the network component associated with the LANs reachable through each of its ports.

Various possibilities exist for communication between nodes, but a normal arrangement would take the following form. Node A wishes to communicate with node B, for which it has the IP address, but not the data link level address. Node A broadcasts an ARP (Address Resolution Protocol) message on LAN 32 asking for node B (specifically, asking the node with IP address 2.0.0.2 to provide its data link layer address). Node B will reply, communication will take place, and router 31 is not involved (beyond receiving, and ignoring, the broadcast ARP message). Node D now wishes to communicate with node A. Node D will be aware that node A has a different network address, and will either be preconfigured to send its message directly to the router 31 (for whose MAC address it will send an ARP request), or may alternatively send an ARP request to which the router 31 (recognising the addressee as being on a different network) will respond. The router will in any case eventually receive a packet from D, and will then send this to the data link layer address of node A if this is already known by the router. If this is not already known the router 31 will send out an ARP request on LAN segment 32 to find the data link layer address for node A. When equipped with the destination data link layer address, the router 31 can forward packets from node D to node A.

As communication through a router is at the level of Internet Protocol (supported by both LAN 32 and LAN 33) and communication at the data link layer level is only between the router 31 (which is adapted to support both the data link layer protocols of LAN 32 and LAN 33) and the individual nodes, communication between nodes on different types of LAN segment is possible. However, router 31 requires significant configuration before use (for example, to provide it with network components for each LAN segment) and it is significantly more complex than a bridge. A further disadvantage of routing is that it is not possible to move a node from one network segment to another without reconfiguration for the node (specifically, without changing its IP address), whereas such movement between networks without node reconfiguration is generally possible for bridges (at least for movement within the same IP domain).

A bridge-like internet protocol router (BLIP) is described in European Patent Application No. 91305968.9 (EP-A2-0456201). The BLIP is devised to have a combination of bridge and router behaviours, and has the particular purpose of preventing the excess propagation of ARP requests ("ARP storm") perceived to provide a technical problem for transparent bridges. The BLIP bases packet forwarding decisions on IP network/subnet addresses alone, and blocks propagation of ARP requests. When a source node requests a data link layer address for a node on a different segment of a LAN by means of an ARP request, the local BLIP responds with a special data link layer address. When the BLIP receives a packet with this special data link layer address, the BLIP forwards the message according to IP subnet address (essentially, it routes) along a spanning tree to other BLIPs—the BLIP at the final destination segment replaces the special data link layer address with the destination node data link layer address (directly if known, or after an ARP request on that segment). In this aspect, BLIP behaviour is router-like.

Particular difficulties are caused if a LAN segment employs a data link layer protocol adapted for dynamic addressing. Such a protocol is EEEE1394 (hereafter "1394", more particularly as described in IEEE Standard 1394-1995, Standard for a High Performance Serial Bus) which has data link layer addressing very different from that of IEEE802.3 (hereafter "802.3"—used as a generic term for protocols of the ethernet type). 802.3 LANs use static, globally unique 48 bit MAC addresses, whereas 1394 LANs use 16 bit Node IDs which are dynamically reassigned whenever a "bus reset" occurs. A bus reset is an event typically associated with a change in the composition of a 1394 LAN, such as addition or removal of a node. A router can be used to connect an 802.3 LAN segment and a 1394 LAN segment, but the dynamic nature of the data link layer addressing demands added complexity, as the router needs resources enabling it to find the current data link layer address. A standard for the use of IP version 4 over 1394 has not currently been finalised, but is under development by the Internet Engineering Task Force (IETF). The current position, indicating the requirements that would be placed on a node in a 1394 LAN communicating under IP (and hence on a router connecting a 1394 LAN to a LAN of a different type), is set out in the IETF Network Working Group Internet-Draft 11 "IPv4 over IEEE 1394" edited by P. Johansson of Congruent Software, Inc., 3998 Whittle Avenue, Oakland, Calif. 94602, USA. This Internet-Draft is expected to be adopted as a standard in the near future, at which point it should appear as an RFC with the same title.

SUMMARY OF THE INVENTION

It would be desirable to combine the simplicity of operation, the transparency to nodes and the ability to learn (rather than requirement for configuration) of a bridge, with the ability of a router to communicate between LAN segments of different network types. This is particularly valuable for a network essentially comprising a backbone of one LAN type with a number of branches of another type (for example, an 802.3 backbone with 1394 branches) for which a router-based solution would be expensive and inconvenient to administer.

Accordingly, in a first aspect the invention provides a network layer bridge for connection between network segments with different data link layer addressing, comprising: a plurality of ports, each for connection to a different network segment, wherein a first port is for connection to a first network segment and a second port is for connection to a second network segment; a memory for storing network layer addresses for nodes together with corresponding port identifiers and data link layer addresses, wherein the memory is adapted to store data link layer addresses of more than one type; means for discovering corresponding port identifier and data link layer address for a network layer address for which these are not already known; and means for forwarding a message from a first node connected through the first network segment to the first port to a second node connected through the second network segment to the second port when the corresponding port identifier and data link level address for both the first and second node are stored in the memory, wherein the message is addressed with the network layer address of the second node, and the network layer bridge directs the message through the corresponding port to the corresponding data link level address for the second node.

Such a network layer bridge is advantageous in that to the first and second nodes, the bridge is transparent: the nodes communicate as if directly between each other, even though they are on network segments with different data link layer addressing. In addition, the network layer bridge has the capacity to learn address information. The network layer bridge as defined above possesses key advantages of a conventional transparent bridge in a structure which can allow communication between network segments of different network types.

For the network layer bridge described above, it is not necessary for both, or either, of the first and second node to be connected directly to a network segment connected directly to a port of the network layer bridge. Instead, the relevant node may be connected to such a network segment through one or more network connection components, such as a router or a conventional transparent bridge. In the case of a router, an effective implementation is for the corresponding data link layer address held by the network layer bridge for any such remote node to be the data link layer address for the associated network connection component which is a node on such a network segment.

In particularly useful applications, a (or the) network layer protocol supported by the network layer bridge is the Internet Protocol. In this case, it is appropriate for the means for discovering corresponding port identifier and data link layer address for a network layer address for which these are not already known to be a means for forwarding or creating ARP messages.

A network layer bridge as described above is advantageously adapted for use where the first or second network segment has a data link layer with dynamic addressing. A particularly useful case of this is where the relevant network segment is in accordance with IEEE 1394-1995. In this case, it is advantageous for the memory in the network layer bridge to be adapted to store data link layer addresses for said data link layer with dynamic addressing which include NodeID and FIFO, and also UID (these terms are defined further below in the description of preferred embodiments). NodeID and FIFO enable effective routing of packets, whereas storage of UID is advantageous as the network layer bridge may then be adapted after a bus reset on the network segment with data link layer dynamic addressing to read the UID of each node on the network segment to reassociate the network layer address with the corresponding data link layer address for each node which is capable of supporting Internet Protocol on the network segment and which is known to the network layer bridge.

The distinctions between the present network layer bridge and the BLIP of EP-A2-0465201 are significant. Network layer bridges according to embodiments of the present invention do not base forwarding decisions on IP network/subnet addresses alone—they act as bridges, and propagate ARP requests. Nodes to either side of a network layer bridge may advantageously belong to the same network/subnet addressing domain, with the whole network layer address used to make forwarding decisions. Nodes may thus be moved between segments connected by a network layer bridge without difficulty—this is not possible for a BLIP without significant reconfiguration.

A further advantageous feature is for the network layer bridge to comprise means to determine whether an IP packet is too large to be transmitted across the bridge on to a receiving network segment, and to fragment the IP packet to a plurality of IP packet fragments of sufficiently small size for transmission on to the receiving network segment (a process defined in RFC 791).

For effective operation, it is desirable for the network layer bridge to have a mechanism to remove obsolete entries, otherwise the number of entries in the address table in the network layer bridge may become excessively large, leading to excessive memory requirements and possibly slow bridge operation. An advantageous solution is found if the memory comprises a timing means to determine a timing period from when a network layer address and corresponding data link layer address and port identifier was last used, wherein when the timing period for a network layer address is exceeded, the network layer address and corresponding data link layer address and port identifier are removed from the memory.

While advantageous, this timeout mechanism leads to some possibility that IP (or other network layer protocol, if appropriate) packets may arrive that cannot be forwarded because the target address data have been lost. To solve this problem, the network layer bridge may be adapted such that if an IP datagram with a target IP address for which the memory has no corresponding data link layer address or port identifier is received, a queue is provided in the memory to cache the IP datagram while the means for discovering the corresponding port identifier and data link layer address for a network layer address discovers the corresponding data link layer address and port identifier for the target IP address, whereupon the IP datagram can be forwarded. An appropriate choice is for the means for discovering the corresponding port identifier and data link layer address for a network layer address to be adapted to send an ARP request to all ports bar the originating one to discover the corresponding data link layer address and port identifier for the target IP address.

The network layer bridge itself may, or may not, have a network layer address. The advantage of having a network layer address is to allow management of the network layer bridge—the network layer address does not contribute to the basic function of the network layer bridge.

In a further aspect the invention provides a network, comprising a plurality of network segments, wherein said network segments are connected together by one or more network connection components, and one or more of the network connection components is a network layer bridge as described above.

Such a network may comprise a backbone of one data link layer type and one or more spurs of a different data link layer type, wherein the backbone is connected to each of the one or more spurs by a network layer bridge. A number of nodes may be connected to the backbone by a single network layer bridge, and there may be a number of network layer bridges attached to the backbone. A particularly useful example is for the backbone to be an IEEE 802.3 LAN segment and the one or more spurs IEEE 1394 LAN segments. Where there is a plurality of network level bridges in the network, it is particularly desirable for the network level bridges to be adapted to communicate to run a spanning tree algorithm to prevent loops arising in any portion of the network.

In a still further aspect, the invention provides a method of bridging between first and second network segments with different data link layer addressing, comprising: connecting the first network segment to a first port of a network layer bridge and the second network segment to a second port of the network layer bridge, the network layer bridge comprising a memory for retaining values for nodes of network layer address with a corresponding data link layer address and port identifier, wherein the memory is adapted to store data link level addresses of more than one type; a first node connected to the network layer bridge through the first network segment sending an address resolution message to elicit the corresponding data link layer address for a second node connected to the network layer bridge through the second network segment; storing in the memory the network layer address with the corresponding data link layer address and port identifier of the first node; sending through the second port an address resolution message to elicit the corresponding data link layer address and port identifier for the second node; once the network layer address, data link layer address and port identifier of the first node and second node are stored in the memory, transmitting messages between the first and second node by sending of a message from one said node with the network layer address of the other said node, and direction of the message by the network layer bridge to the other said node through the appropriate port to the appropriate data link layer address for the other said node.

In a further related aspect the invention also provides a method of bridging between first and second network segments with different data link layer addressing, comprising: connecting the first network segment to a first port of a network layer bridge and the second network segment to a second port of the network layer bridge, the network layer bridge comprising a memory for retaining values for nodes of network layer address with a corresponding data link layer address and port identifier, wherein the memory is adapted to store data link level addresses of more than one type; a first node connected to the network layer bridge through the first network segment sending a message with the network layer address of a second node connected to the network layer bridge through the second network segment; storing in the memory the network layer address with the corresponding data link layer address and port identifier of the first node, and recalling from the memory the corresponding data link layer address and port identifier for the second node (if already present in the memory); sending through the second port an address resolution message to elicit the corresponding data line layer address and port identifier for the second node if these are not present in the memory; once the network layer address, data link layer address and port identifier of the first node and second node are stored in the memory, transmitting the message from the first node to the second node through direction of the message by the network layer bridge to the second node through the appropriate port to the appropriate data link layer address for the second node.

The methods provided for by the two aspects mentioned above are not restricted to nodes on adjacent network segments connected by a network layer bridge. These methods are applicable to communication between any two nodes where the communication passes through a network layer bridge in respect of the stages of this communication that pass between the network layer bridge and the network segments attached to the network layer bridge. The nodes communicating may be connected with the network layer segments attached to the bridge indirectly, for example through other network connection components such as routers or transparent bridges. In particular, it is apparent how such methods may be used to connect to network segments with dynamic addressing such as TEEE1394 by use of appropriate network layer bridges as described above.

BRIEF DESCRIPTION OF THE DRAWINGS

Embodiments of the invention are described, by way of example, with reference to the accompanying drawings, of which.

DETAILED DESCRIPTION

Figure 1:
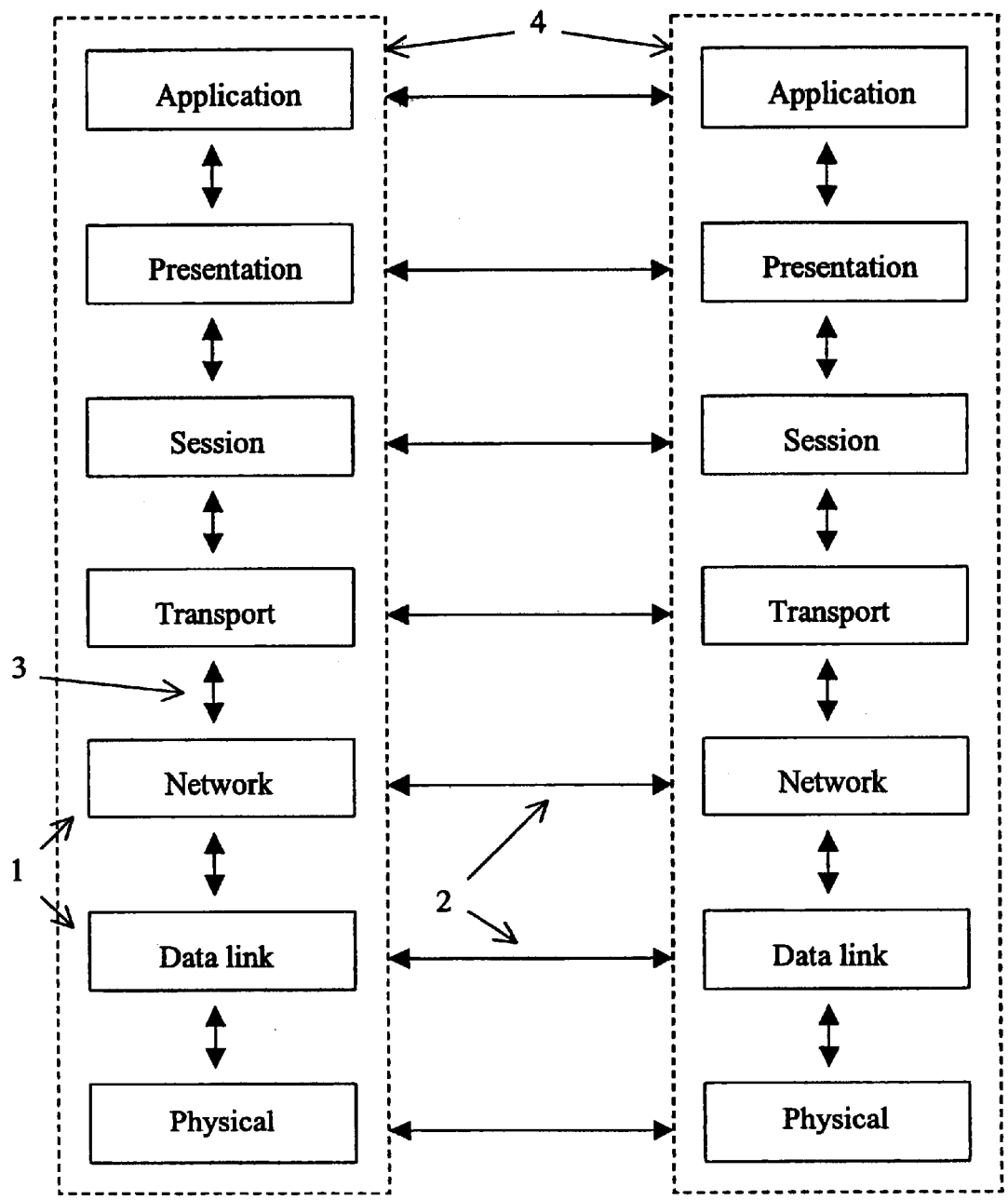
FIG. 1 shows the network layers according to the ISO definition of a computer network.
Figure 2:
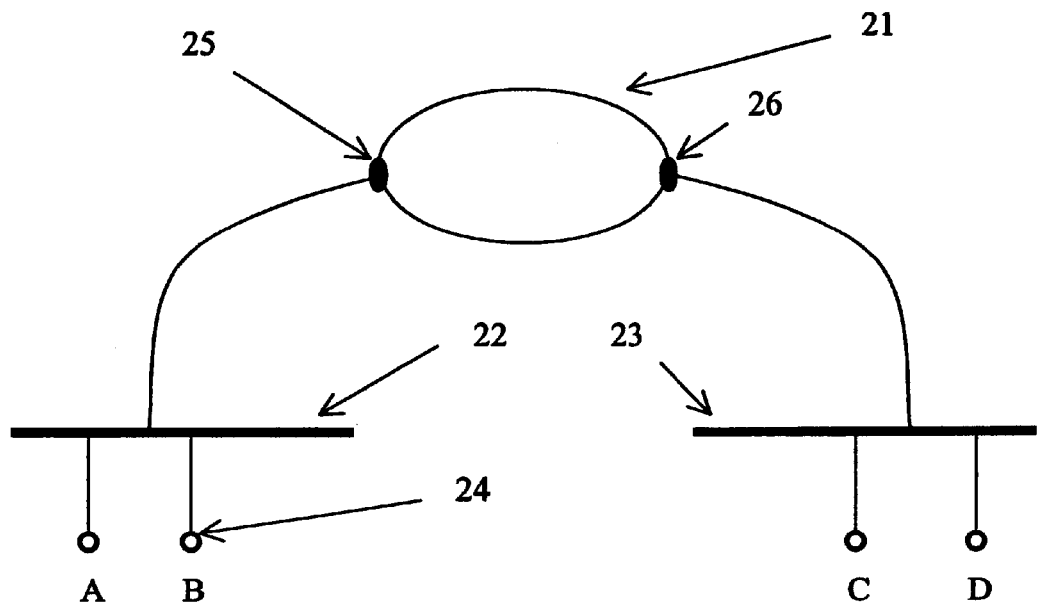
FIG. 2 shows two LAN segments connected by a conventional bridge.
Figure 3:
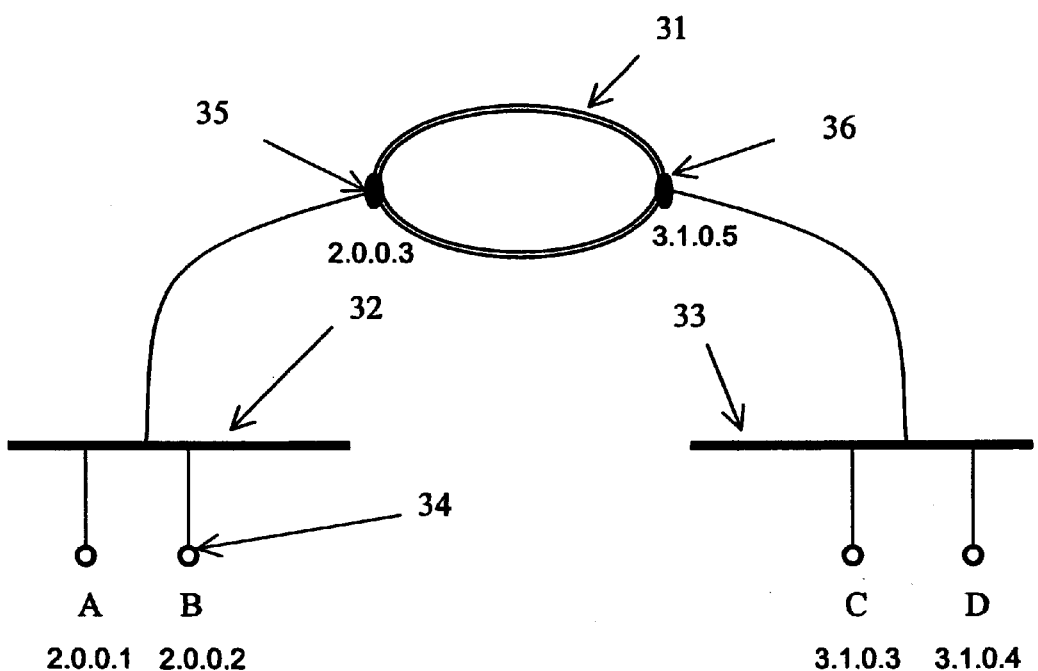
FIG. 3 shows two LAN segments of different type connected by a conventional router.
Figure 4A:
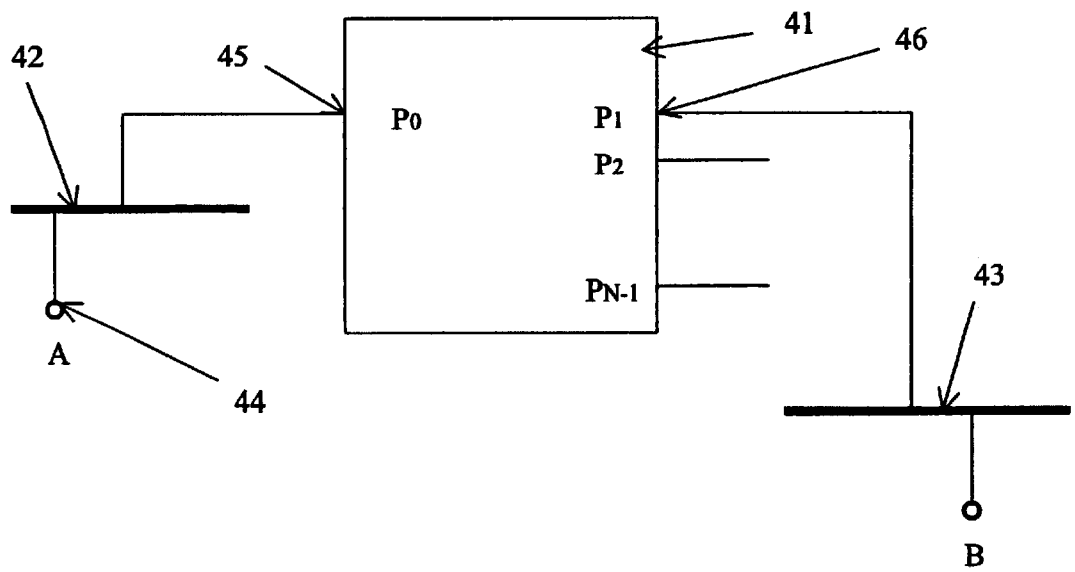
FIGS. 4A to 4D show use of a network layer bridge for communication between nodes on 802.3 LAN segments.

FIG. 4A shows a bridge adapted to connect LAN segments at the network layer level. In the FIG. 4A case, all the LAN segments for interconnection are 802.3 LANs, with the same data link layer addressing. The bridge may thus be of the RFC 925 type: basic operation of an RFC 925 bridge or a bridge according to embodiments of the invention would be substantially the same where the LAN segments are of the same type. For a clear explanation of the function of embodiments of the invention, it is convenient to address behaviour where both LAN segments are the same.

The bridge 41 (termed a "network layer bridge" for distinction from conventional bridge types) has a plurality of ports, each for connection to a different LAN segment. In this case, only communication between LAN segment 42 and LAN segment 43 is considered, though the following discussion is applicable to communication between any two similar LAN segments. Network layer bridge 41 is connected to LAN segment 42 through port $P_0$, labelled 45, and to LAN segment 43 through port $P_1$, labelled 46. Each LAN segment has nodes 44: here, communication between node A on LAN segment 42 and node B on LAN segment 43 is considered. Network layer bridge 41 also contains a memory 40 (see FIG. 4C) for storing IP addresses for nodes, with corresponding port identifiers and MAC addresses.

Figure 4B:
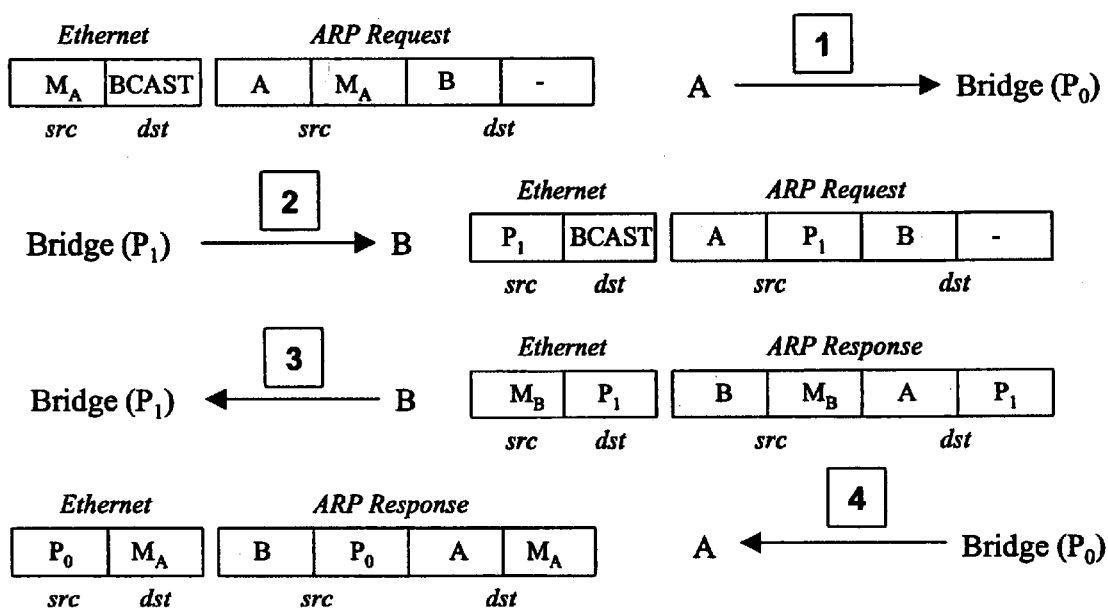
Figure 4C:
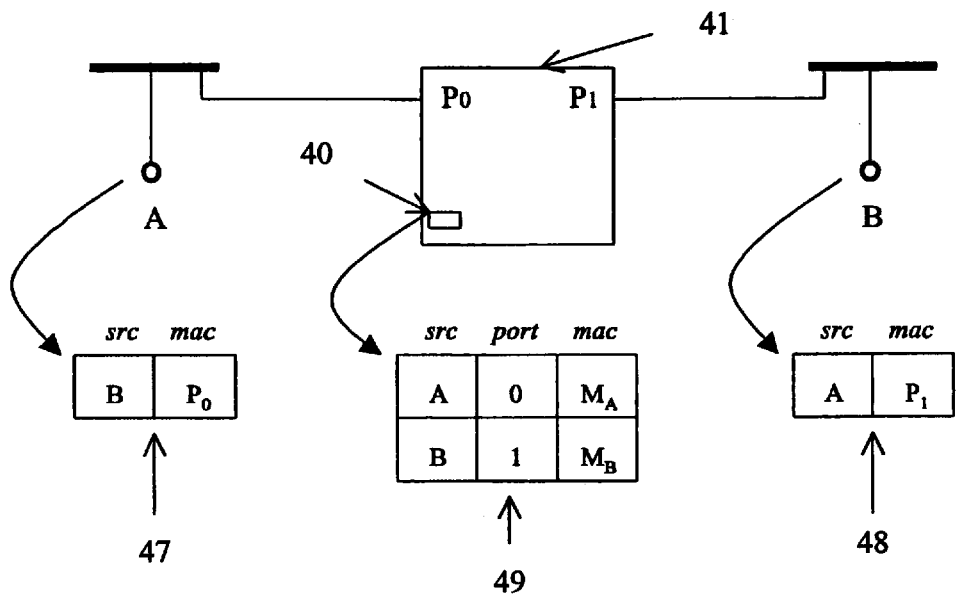
Figure 4D:
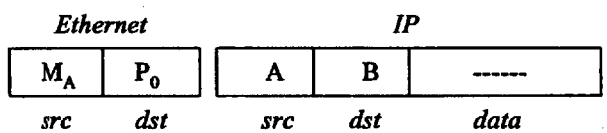
Figure 4D:
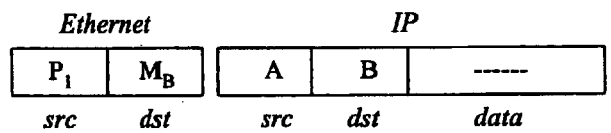

In the case of node A wishing to send IP datagrams to node B, the following procedure can be followed with reference to FIGS. 4B, 4C and 4D. Node A does not know the data link layer address for node B, but it does know the IP address. Node A has an ARP cache—a memory in which it holds data link addresses corresponding to IP addresses—but there is not yet a valid entry for the IP address of node B. ARP caches are not strictly an essential feature of IP nodes, although in practice they are almost universally provided. Node B, and any other node supporting IP, will have an ARP cache also. Node A will therefore send out a broadcast ARP request in the normal manner for IP, requesting the data link layer address for the node B (Message 1 in FIG. 4B). As node B is not on LAN segment 42, there will be no response to this message from the other nodes on that LAN segment. However, the network layer bridge is adapted to receive all broadcast ARP request packets and take the following actions.

1: Extract the following information from the arrival of the ARP request and store it in the bridge memory (if it is already present, the bridge memory updates the data anyway—this is a mechanism to prevent the bridge memory holding out-of-date address information)—the IP address of node A, the port used to access node A (in this case, $P_0$), and the MAC address of node A.

2: Forward the ARP request to all other ports (in this case, all ports from $P_1$ to $P_{N-1}$) and update the source MAC address field with that of the outgoing port. This is message 2 in FIG. 4B (shown for port $P_1$ only).

This ARP request is received by node B (and also by every other node except those on LAN segment 42—however all nodes except node B will ignore the message). Node B, however, will update its ARP cache with the data in the ARP request (that the IP address of node A is reachable through the MAC address for port $P_1$) and respond to the message, providing its MAC address (message 3 in FIG. 4B). When it receives this message, the network layer bridge 41 is able to take the following actions.

1: Extract the following information from the ARP response and store it in the bridge memory (updating the bridge memory if corresponding information is already present)—the IP address of node B, the port used to access node B (in this case, $P_1$), and the MAC address of node B.

2: Look up the destination IP address in the ARP response, and find that the relevant node, A, can be reached on port $P_0$ using MAC address $M_A$.

3: Forward the ARP response to A, updating the destination MAC address with $M_A$ and the source MAC address field with that of the outgoing port ($P_0$). This is message 4 in FIG. 4B.

Node A receives the ARP response, and updates its ARP cache with the information that node B can be reached using MAC address $P_0$. The state of the ARP caches 47, 48 in nodes A and B, and of the ARP table 49 stored in memory 40 in network layer bridge 41, is shown in FIG. 4C.

It is now possible for node A to send IP datagrams to node B. This is illustrated in FIG. 4D. Node A looks up the IP address of node B in its ARP cache 47, and finds MAC address $P_0$. It then forwards the IP datagram to the network layer bridge 41 through $P_0$. The network layer bridge 41 then looks up the IP address of node B in its ARP table 49, and finds port $P_1$ and MAC address $M_B$. The network layer bridge 41 then forwards the IP datagram to node B. Similarly, it is now possible for node B to send IP datagrams to node A, as both the ARP cache 48 of node B and the ARP table 49 of the network layer bridge 41 have equivalent information for node A.

It is clear that variants of this process are possible. For example, the network layer bridge 41 may be adapted to learn directly from every IP source packet (by, for example, listening promiscuously to all traffic), though it is not clear that the benefit of improved learning speed is great enough to justify the load that this would place on the bridge. The network layer bridge 41 thus enables communication between LAN segments of similar type without configuration. This is, however, achievable more simply with conventional data link layer level bridges.

Figure 5A:
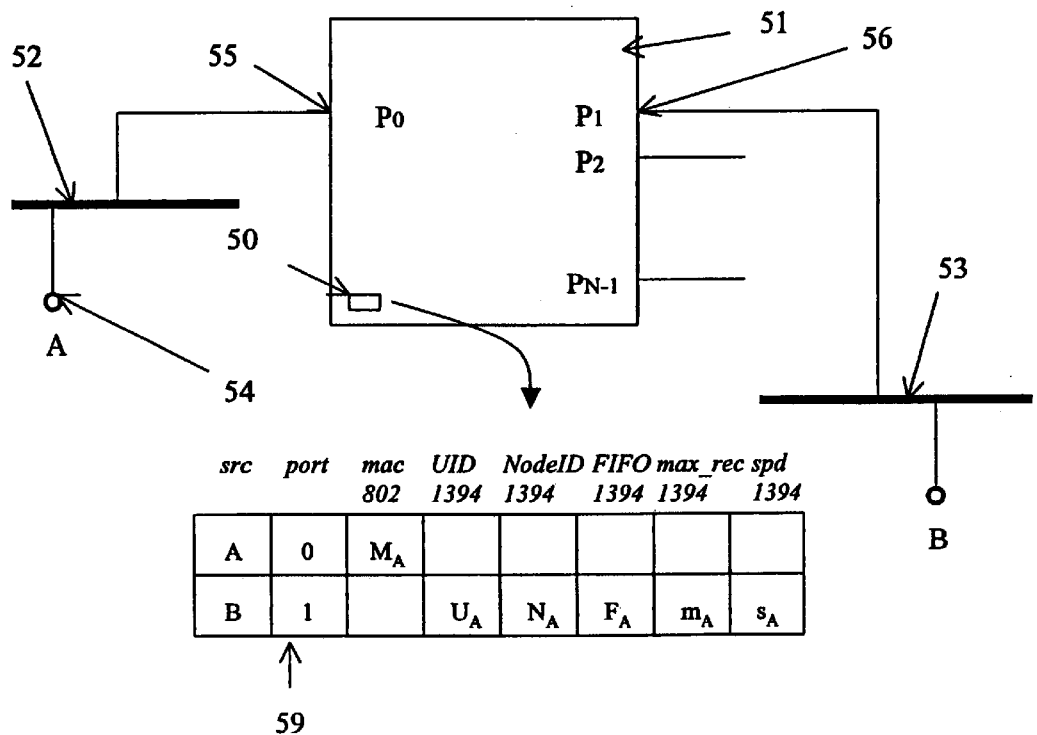
FIGS. 5A to 5C show use of a network layer bridge for communication between nodes on an 802.3 LAN segment and a 1394 LAN segment.

The present inventors have however realised that a modified form of this scheme can be employed to link LAN segments of different types—a problem that is generally considered to require a router for solution. FIG. 5 shows an embodiment of the invention utilising a network layer bridge 51 (which has a memory 50 for storing IP addresses for nodes with corresponding port identifiers and MAC addresses or other data link layer addresses) adapted to connect between a node on an 802.3 LAN 52 and a node on a 1394 LAN 53.

The data link layer in a 1394 LAN is quite different from the data link layer in an 802.3 LAN. 802.3 LANs have globally unique 48 bit MAC addresses. 1394 LANs do also have a globally unique ID—the 64 bit UID—but this is in practice less useful as it will not, according to current proposals, be present in an IP packet. In the data link layer of a 1394 network, asynchronous transactions are directed to a 16 bit NodeID. This 16 bit NodeID can change after a 1394 bus reset, caused by, for example, addition or removal of a device. Moreover, packet fragmentation and reassembly may be required at the data link layer, because the maximum packet size is 512 bytes in 1394 at the standard speed of 100 mbps, as opposed to 1500 for an 802.3 LAN (although 1394 LANs operating at greater speeds than the minimum of 100 mbps have larger maximum packet sizes, and at 400 mbps or greater no fragmentation would be required).

The basic difficulty caused by the different nature of data link layer addressing in 1394 can be solved by introducing a new form of ARP table 59 in the network layer bridge 51. This ARP table 59, shown in FIG. 5A, allows necessary fields of a 1394 LAN ARP packet to be entered. The relevant fields are: UID, NodeID, FIFO, max_rec and spd. These fields and their application are discussed in the IETF Network Working Group Internet-Draft 11 (where they are referred to, respectively, as: sender_unique_ID or target_unique_ID; sender_node_ID or target_node_ID; sender_unicast_FIFO_hi and sender_unicast_FIFO_lo or target_unicast_FIFO_hi and target_unicast_FIFO_lo; sender_max_rec or target_max_rec; and sspd or tspd; for each pair above the choice depending on whether the relevant parameter is in a field identifying the sender or target of the message). UID is the node unique ID, a 64-bit number that uniquely identifies a node among all the 1394 nodes manufactured worldwide—as will be discussed below, UID is of value in the event of a bus reset. NodeID is a 16-bit number that uniquely identifies a 1394 node within a group of multiple interconnected buses. FIFO fields specify a 48-bit offset of a FIFO buffer available for the receipt of IP datagrams: the NodeID and FIFO together form the 64 bit address to which the 1394 transactions carrying an IP datagram should be written. max_rec specifies fragment size, and spd specifies transmission speed, and both will be significant for packet fragmentation.

Figure 5B:
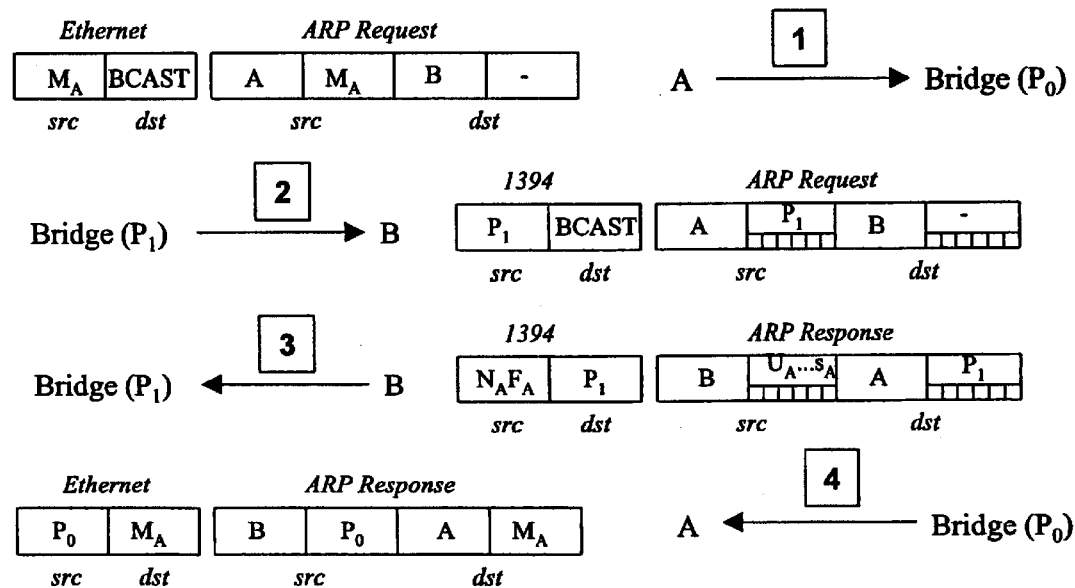

In the case of simple transmissions between node A on 802.3 LAN 52 and node B on 1394 LAN 53, the position is shown in FIG. 5B, starting from the point at which neither node has any knowledge of the other node, beyond A having the IP address of B, and the network layer bridge 51 having no knowledge of either node. Node A will send out a broadcast (802.3) ARP request in the normal manner for IP, requesting the data link layer address for node B (Message 1 in FIG. 5B). As node B is not on LAN segment 52, there will be no response to this message from the other nodes on that LAN segment. However, the network layer bridge 51 is as before adapted to receive all broadcast ARP request packets and store in the bridge memory 50 the IP address of node A, the port used to access node A (in this case, $P_0$), and the MAC address of node A. The network layer bridge 51 must either be preconfigured with the knowledge that LAN segment 52 (or rather, the LAN segment accessed through port $P_0$) is an 802.3 segment, or else the network layer bridge must contain means to deduce this information from packets received through $P_0$ or else obtain the information from another available resource. This is achievable as an automatic part of the power-up sequence for the network layer bridge—ports are assigned with port numbers during power-up. The network layer bridge 51 will also forward the ARP request to all other ports (in this case, all ports from $P_1$ to $P_{N-1}$). This requires knowledge of the LAN segment type accessible through each port (as before, obtainable through preconfiguration, autodetection, or knowledge of appropriate resources on the system). The network layer bridge 51 is aware that the segment reached through port $P_1$ is a 1394 segment (LAN segment 53), and therefore knows to translate the 802.3 ARP request into a 1394 ARP request, with the fields as indicated above—this is shown as message 2 in FIG. 5B.

As in the previous example, this ARP request is received by node B and also by every other node except those on LAN segment 52. All nodes except node B will ignore the message. Node B, however, will update its ARP cache with the data in the message in respect of Node A and will respond to the message, providing a 1394 ARP response (message 3 in FIG. 5B). When it receives this message, the network layer bridge 51 is able to take the following actions.

1: Extract the following information from the arrival of the ARP response and store it in the bridge memory—the IP address of node B, the port used to access node B (in this case, $P_1$), and all the further information needed for the ARP cache 59.

2: Look up the destination IP address in the ARP response, and find that the relevant node, A, can be reached on port $P_0$ using 802.3 MAC address $M_A$.

3: Translate the 1394 ARP response to an 802.3 ARP response for onward transmission to node A, updating the destination MAC address with $M_A$ and the source MAC address field with that of the outgoing port ($P_0$). This is message 4 in FIG. 5B.

Figure 5C:
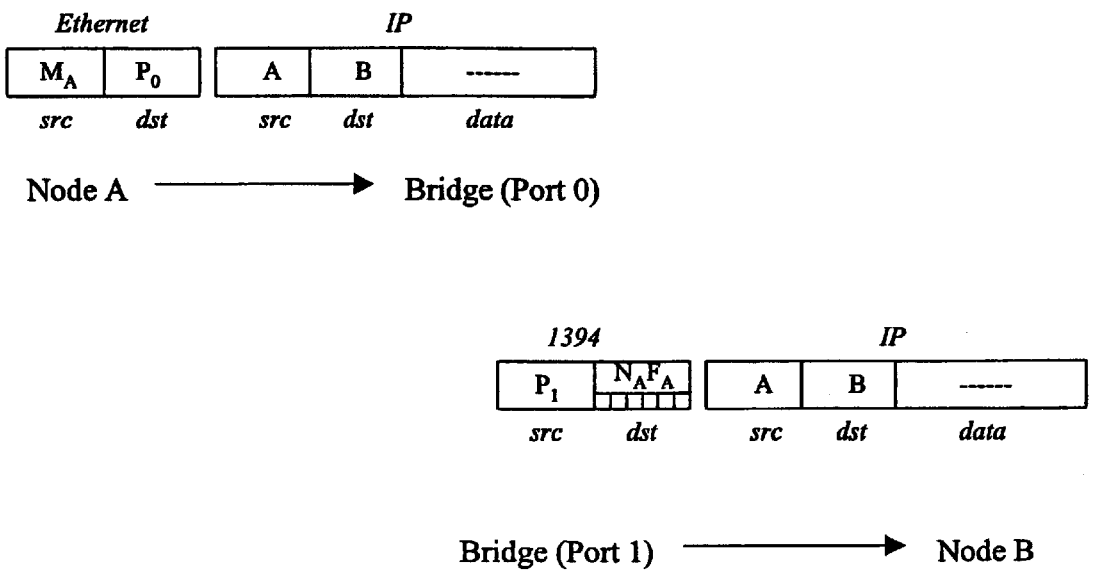

The 802.3 ARP response is then received by node A, which updates its ARP cache accordingly. IP datagrams can now be sent from node A to node B. This is shown in FIG. 5C. A datagram is sent from node A to node B, and is thus received at the network layer bridge 51. The network layer bridge 51 has a complete ARP table entry for node B, and knows that node B is accessible through port $P_0$ and that its data link layer address shows it lies on a 1394 LAN. The network layer bridge 51 therefore replaces the 802.3 LAN header with a 1394 LAN header, performing 1394 link fragmentation of the IP packet if required—it is possible to determine whether fragmentation is necessary from the packet size and the max_rec field in the ARP cache from node B together with the speed achievable to node B.

If a network layer bridge is connected to a 1394 LAN segment, it is strongly desirable to have a mechanism present to rebuild the ARP table in the bridge when a bus reset occurs. A bus reset may affect any of the NodeIDs on the segment, and hence the corresponding ARP table entries. Rebuilding the ARP table can be done by using a read request supported by the 1394 protocol—the simplest approach is to request the UID value for each node on the bus in turn (there are a maximum of 63 other nodes on a 1394 bus, so this is not an onerously long process) and attempt to match them to the existing ARP table entries—an optimisation is simply to stop this process if all the UIDs in the relevant ARP table entries have been found. If a particular UID can no longer be found, it is advantageous to mark entries relating to this UID as "dormant" so that IP packets cannot be forwarded to the node concerned, but so that the relevant entry is still available to the bridge for easy reinstatement. An advantage of marking such entries as dormant is that the table does not need such extensive rebuilding in the event of a temporary change (such as disconnecting a network layer bridge and reconnecting it again)—it is common for bus resets to occur in pairs in this way. An alternative mechanism is to use the UID of each node with a table entry on that LAN segment to make a table mapping Node ID before the bus reset onto Node ID after the bus reset. It would also be possible to use techniques which did not rely on knowledge of the UID address—for example, deleting all entries for the relevant port from the ARP table and sending out ARP requests where required—but use of the UID will in most circumstances be more efficient (deletion may, for example, cause packets to be dropped while the bridge sends out ARP requests for entries that should be present, but have been deleted only to be restored when an ARP response appears).

Another feature that is in practice strongly desirable is to incorporate a mechanism for removing entries from the ARP table of a network layer bridge. If there is no such mechanism, over time the table is likely to increase to the point of overflow, and will contain an increasing number of inactive entries. An appropriate mechanism is to remove table entries that have been inactive between regular activity checks.

However, if entries are aged out through inactivity for a defined period, there is a possibility that nodes will age their ARP caches slower than the network layer bridge ages its ARP table—in which event it is possible that the network layer bridge will receive IP datagrams for target IP addresses for which the network layer bridge has no ARP table entry. This could be solved by ageing ARP table entries out very slowly, but this has disadvantages: it assumes that all attached LAN segments will have a shorter ageing time; it results in an unnecessarily large cache; and the network layer bridge would be particularly vulnerable if an event (for example, power cycling of the network layer bridge) resulted in a loss of the entire cache. The improved solution is found to be to provide a mechanism at the network layer bridge to issue an ARP request when an IP packet to an unknown address is received. This ARP request for the unknown source address can use the IP source address in the waiting datagram, and is sent to all ports except the source port. When the ARP response arrives, the network layer bridge can create the table entry as before and continue. To prevent difficulties of implementation, this ARP response is forwarded to the source address (even though it was never requested)—however, this merely results in updating of the ARP cache at the source node, which is not disadvantageous. The IP datagram could be either queued or dropped—the former requires more bridge resources (a buffer memory and a mechanism for retrieving the queued packet or packets and sending it to the target address when the ARP table has been updated), but although most high level protocols could cope with the dropping of an IP packet, this would generally be undesirable.

Figure 6:
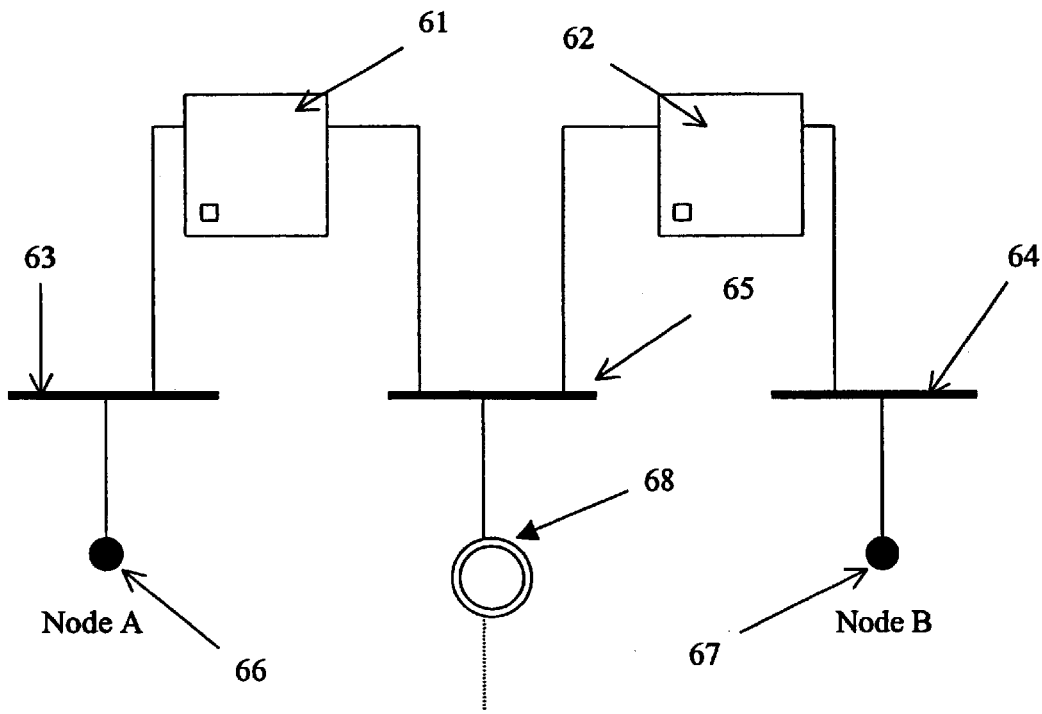
FIG. 6 shows use of a network layer bridge for communication across plural LAN segments and for communication with remote IP nodes.

It is in practice desirable to use a network layer bridge as discussed above in a more complex network than a simple pair of segments or star topology as indicated in the examples above. It would, for example, be quite possible to connect nodes separated by two network level bridges. This is shown in FIG. 6. Two network layer bridges 61 and 62 connect 1394 LAN segments 63 and 64 through an 802.3 LAN segment 65. Communication between a node A (designated 66) on LAN segment 63 and a node B (designated 67) on LAN segment 64 is established as follows, with the starting point that node A knows the IP address of node B.

1. Node A sends a 1394 ARP request for the data link layer address of node B.
2. The 1394 ARP request is received by network layer bridge 61. There is no entry for node B in the ARP table of network layer bridge 61, so the request is forwarded on to all other ports connected to network layer bridge 61. For transmission on to LAN segment 65, the 1394 ARP request is translated into an 802.3 ARP request (as discussed above), with source data link layer data associated with the network layer bridge 61. Network layer bridge 61 updates its ARP table in respect of node A.
3. The 802.3 ARP request is received by network layer bridge 62, after transmission across LAN segment 65. Again, there is no entry for node B in the ARP table of network layer bridge 62, so the request is forwarded on to all other ports connected to network layer bridge 62. For transmission on to LAN segment 64, the 802.3 ARP request is translated into a 1394 ARP request with source data link layer data associated with network layer bridge 62. Network layer bridge 62 updates its ARP table in respect of node A—the data link layer data in the table will not be those of node A, but rather those applicable to network layer bridge 61.
4. The 1394 ARP request is received by node B. Node B updates its ARP cache in respect of node A—the data link layer data in the cache will of course not be those of node A itself, but those appropriate to network layer bridge 62. Node B then provides a 1394 ARP response.
5. The 1394 ARP response is received by network layer bridge 62, which updates its ARP table in respect of node B. The 1394 ARP response is translated into an 802.3 ARP response, with source data link layer data associated with network layer bridge 62, and sent to network layer bridge 61 (in accordance with the data in the ARP table of network layer bridge 62).
6. The 802.3 ARP response is received by network layer bridge 61, which updates its ARP table in respect of node B—again, the data link layer data in the table will not be those of node B itself, but will be those applicable to network layer bridge 62. The 802.3 ARP response is translated into a 1394 ARP response with the data link layer data of network layer bridge 61, and sent to node A on LAN segment 63.
7. Node A receives the 1394 ARP response and updates its ARP cache with the information that node B can be reached through the data link layer address of network layer bridge 61.

It is then possible for node A to send IP packets to node B through network layer bridge 61 and 62 essentially as described in previous examples.

It is of course also possible to communicate with remote IP addresses through a router or similar network component. The approach to be adopted depends on the nature of the router. If the router fully supports ARP, it is possible to use the network layer bridge as a proxy for the router ("proxy ARP"). This is discussed with reference to FIG. 6, which shows a router 68 on the 802.3 LAN segment 65. If node A wishes to communicate with an IP address accessible through the router, initial communication would be as follows.

1. Node A sends a 1394 ARP request for the data link layer address of the remote node.
2. The 1394 ARP request is received by network layer bridge 61. There is no entry for the remote node in the ARP table of network layer bridge 61, so the request is forwarded on to all other ports connected to network layer bridge 61. For transmission on to LAN segment 65, the 1394 ARP request is translated into an 802.3 ARP request (as discussed above), with source data link layer data associated with the network layer bridge 61. If necessary, network layer bridge 61 updates its ARP table in respect of node A.
3. The 802.3 ARP request is received by the router 68, after transmission across LAN segment 65. Through preconfiguration, the router recognises the target IP address of the ARP request as being on a different network, and that it is to be responsible for forwarding IP datagrams to that other network. The router 68 updates its ARP cache (which it will have, as a node on the LAN segment 65) with the network layer data of node A and the data link layer data of network layer bridge 61, and sends an ARP response to the ARP request.
4. The ARP response is received by network layer bridge 61, and forwarded back to node A. The ARP table of the network layer bridge and the ARP cache of node A are updated accordingly.

Node A can then send IP packets for transmission to the remote node—these will be directed by the network layer bridge 61 to router 68, for onward transmission in the normal manner for a router.

However, routers also exist which do not support proxy ARP. When such routers are used, nodes connecting with them are configured with the IP address of the router. The process of sections 1 and 2 above therefore cannot operate. It is therefore necessary for the network layer bridge to be configured with a default route to the router in essentially the same manner as is needed for any IP node using such a router. More specifically, in this case both the node and the network layer bridge need to be configured with knowledge of the network component of the local LAN segment and the IP address of a router attached to the local LAN segment (a default route). The node checks the destination IP address of each outgoing packet against the network component of the local LAN segment to determine if the destination is local (connected to the local LAN segment) or remote (only reachable through a router). If the destination is local, the node makes use of ARP to determine the destination's MAC level address, and directs the the packet to this. If the destination is remote, the node makes use of ARP to determine the router's MAC level address and directs the packet to this. If there is a network layer bridge between the node and the router, the ARP exchange between the node and the router will be modified by the network layer bridge so that the MAC level address returned to the node will be that of the network layer bridge. The node will thus direct the IP packet for the remote destination to the network layer bridge. The network layer bridge now checks the destination IP address of the packet against the network component of the local LAN segment, and finds that the destination is remote. The network layer bridge makes use of ARP to determine the router's MAC level address, and directs the IP packet to this. It is clear that this scheme generalizes to the node and the router being separated by multiple network layer bridges.

A potential source of difficulty with network level bridges is the creation of a loop around which unnecessary traffic, such as ARP requests directed away from the actual location of the target, may propagate endlessly. In certain protocols, such circulation may cause serious difficulty if a node sees a packet with its own network layer address and a different data link layer address. The possibility of multiple paths to each host also creates difficulties, in particular packet re-ordering. This problem arises at other networking levels, in particular for transparent bridges at the data link level. A mechanism for solving this problem at the data link level is known for 802.3 LANs—this is the spanning tree algorithm, discussed for example in "Interconnections" by Radia Perhman, 1992, Addison-Wesley Publishing Company, Reading, Mass. at pages 54 to 73 and defined in respect of 802.3 LANs by the IEEE 802.1 committee. The spanning tree algorithm allows transparent bridges to discover dynamically a loop-free subset of the network topology (a tree) which nonetheless allows connection between any two nodes if physically possible (the tree is spanning).

The 802.1 spanning tree algorithm can be run at the network layer level, without significant modification, to define a spanning tree at the network layer level, thus preventing the problem of loops. A desirable approach is to run the spanning tree algorithm first at the data link layer level, and then separately at the network layer level, with the network layer bridges ignoring the spanning tree packets propagated in order to construct the spanning trees at the data link layer level—each bridged 802.3 LAN thus results in a separate spanning tree. Once the process of constructing 802.1 spanning trees is complete, the network level bridges can start their spanning tree algorithm and construct a network layer level spanning tree. This algorithm will need to be run regularly to prevent loops appearing after network topology changes—an appropriate approach is to run the data link level spanning tree algorithm regularly, and to run the network level spanning tree algorithm if any changes are found.

As the skilled man will be aware, many modifications and enhancements may be made to the schemes described above as examples without deviating from the present invention. An enhancement that may be employed is to provide each network layer bridge with its own IP address. This IP address is not essential for the bridge to perform its bridging function as described here—however, provision of an IP address allows for the possibility of remote control and configuration of the network layer bridge from elsewhere on the network (this is of known utility for 802.1d bridges).

Network layer bridges as described here allow for the connection of LAN segments in a manner that is transparent to nodes on the LAN, even where LAN segments have different data link layer types. This allows for creation of versatile data networks (such as a LAN backbone of 802.3 with "branches" of 1394 for, say, individual offices or work areas—the opposite of a 1394 backbone with 802.3 branches may also be useful—for example for running peripherals from a personal computer) allowing addition and removal of nodes without need for any manual configuration at all, or even significant automatic reconfiguration. This versatility can be achieved because the learning capacity of the network layer bridge allows traffic to flow without reconfiguration.

What is claimed is:

1. A network layer bridge for connection between network segments with different data link layer addressing, comprising:

a plurality of ports, each for connection to a different network segment, wherein a first port is for connection to a first network segment and a second port is for connection to a second network segment;

a memory for storing network layer addresses for nodes together with corresponding port identifiers and data link layer addresses, wherein the memory is adapted to store data link layer addresses of more than one type;

wherein the network layer bridge is adapted to discover corresponding port identifier and data link layer address for a network layer address for which these are not already known; and to forward a message from a first node connected through the first network segment to the first port to a second node connected through the second network segment to the second port when the corresponding port identifier and data link level address for both the first and second node are stored in the memory, wherein the message is addressed with the network layer address of the second node, and the network layer bridge directs the message through the corresponding port to the corresponding data link level address for the second node, and wherein the memory comprises a timer to determine a timing period from when a network layer address and corresponding data link layer address and port identifier was last used, wherein when the timing period for a network layer address is exceeded, the network layer address and corresponding data link layer address and port identifier are removed from the memory.

2. A network layer bridge as claimed in claim 1, wherein one or both of the first node and the second node is not connected directly to a network segment connected directly to a port of the network layer bridge, but is connected to such a network segment through one or more network connection components.

3. A network layer bridge as claimed in claim 2, wherein for any one of the first node and the second node not connected directly to a network segment connected directly to a port of the network layer bridge, the corresponding data link layer address for said any one of the first node and the second node is the data link layer address for one of said one or more network connection components which is a node on such a network segment.

4. A network layer bridge as claimed in claim 2, wherein one or more of said one or more network connection components is a router.

5. A network layer bridge as claimed in claim 2, wherein one or more of said one or more network connection components is an IEEE 802.1d bridge.

6. A network layer bridge as claimed in claim 1, wherein a network layer protocol supported by the network layer bridge is the Internet Protocol.

7. A network layer bridge as claimed in claim 6, wherein to discover corresponding port identifier and data link layer address for a network layer address for which these are not already known the network layer bridge forwards or creates Address Resolution Protocol messages.

8. A network layer bridge as claimed in claim 1, adapted such that either the first or second network segment has a data link layer with dynamic addressing.

9. A network layer bridge as claimed in claim 8, wherein said data link layer with dynamic addressing is in accordance with IEEE 1394-1995.

10. A network layer bridge as claimed in claim 9, wherein the memory is adapted to store data link layer addresses for said data link layer with dynamic addressing which include NodeID and FIFO.

11. A network layer bridge as claimed in claim 9, wherein the memory is adapted to store data link layer addresses for said data link layer with dynamic addressing which includes UID.

12. A network layer bridge as claimed in claim 11, wherein the network layer bridge is adapted after a bus reset on the network segment with data link layer dynamic addressing to read the UID of nodes on the network segment to reassociate the network layer address with the corresponding data link layer address for each such node which is capable of supporting Internet Protocol on the network segment and which is known to the network layer bridge.

13. A network layer bridge as claimed in claim 6, and adapted to determine whether an IP packet is too large to be transmitted across the bridge on to a receiving network segment, and to fragment the IP packet to a plurality of IP packet fragments of sufficiently small size for transmission on to the receiving network segment.

14. A network layer bridge as claimed in claim 1 wherein, a network layer protocol supported by the network layer bridge is the Internet Protocol, the network layer bridge being adapted such that if an IP datagram with a target IP address for which the memory has no corresponding data link layer address or port identifier is received, a queue is provided in the memory to cache the IP datagram while the means for discovering the corresponding port identifier and data link layer address for a network layer address discovers the corresponding data link layer address and port identifier for the target IP address, whereupon the IP datagram can be forwarded.

15. A network layer bridge as claimed in claim 14, wherein to discover the corresponding port identifier and data link layer address for a network layer address the network layer bridge is adapted to send an ARP request to discover the corresponding data link layer address and port identifier for the target IP address.

16. A network layer bridge as claimed in claim 1, wherein the network layer bridge has a network layer address.

17. A network layer bridge as claimed in claim 1, wherein the network layer bridge has no network layer address.

18. A network, comprising a plurality of network segments, wherein said network segments are connected together by one or more network connection components, and one or more of the network connection components is a network layer bridge, wherein said network layer bridge comprises:

a plurality of ports, each for connection to a different network segment, wherein a first port is for connection to a first network segment and a second port is for connection to a second network segment;

a memory for storing network layer addresses for nodes together with corresponding port identifiers and data link layer addresses, wherein the memory is adapted to store data link layer addresses of more than one type;

wherein the network layer bridge is adapted to discover corresponding port identifier and data link layer address for a network layer address for which these are not already known; and to forward a message from a first node connected through the first network segment to the first port to a second node connected through the second network segment to the second port when the corresponding port identifier and data link level address for both the first and second node are stored in the memory, wherein the message is addressed with the network layer address of the second node, and the network layer bridge directs the message through the corresponding port to the corresponding data link level address for the second node; and wherein there are a plurality of said network level bridges in the network, and the network level bridges are adapted to communicate to run a spanning tree algorithm to prevent loops arising in a portion of the network.

19. A network as claimed in claim 18, wherein the spanning tree algorithm run by the network level bridges is independent of any spanning tree algorithm run by other network components at the data link level.

20. A method of bridging between first and second network segments with different data link layer addressing, comprising:

connecting the first network segment to a first port of a network layer bridge and the second network segment to a second port of the network layer bridge, the network layer bridge comprising a memory for retaining values for nodes of network layer address with a corresponding data link layer address and port identifier, wherein the memory is adapted to store data link level addresses of more than one type;

a first node connected to the network layer bridge through the first network segment sending an address resolution message to elicit the corresponding data link layer address for a second node connected to the network layer bridge through the second network segment;

storing in the memory the network layer address with the corresponding data link layer address and port identifier of the first node;

sending if necessary through the second port an address resolution message to elicit the corresponding data link layer address and port identifier for the second node;

once the network layer address, data link layer address and port identifier of the first node and second node are stored in the memory, transmitting messages between the first and second node by sending of a message from one said node with the network layer address of the other said node, and direction of the message by the network layer bridge to the other said node through the appropriate port to the appropriate data link layer address for the other said node, wherein either the first or second network segment has a data link layer with dynamic addressing; and wherein said data link layer with dynamic addressing is in accordance with IEEE 1394-1995; and wherein the memory is adapted to store data link layer addresses for said data link layer with dynamic addressing which includes UID.

21. A method as claimed in claim 20, further comprising after storing in the memory the network layer address with the corresponding data link layer address and port identifier of the first node, recalling if present from the memory the corresponding data link layer address and port identifier for the second node and therefore not sending through the second port an address resolution message to elicit the corresponding data link layer address and port identifier for the second node.

22. A method as claimed in claim 20, wherein one or both of the first node and the second node is not connected directly to a network segment connected directly to a port of the network layer bridge, but is connected to such a network segment through one or more network connection components.

23. A method as claimed in claim 22, wherein for any one of the first node and the second node not connected directly to a network segment connected directly to a port of the network layer bridge, the corresponding data link layer address for said any one of the first node and the second node is the data link layer address for one of said one or more network connection components which is anode on such a network segment.

24. A method as claimed in claim 22, wherein one or more of said one or more network connection components is a router.

25. A method as claimed in claim 22, wherein one or more of said one or more network connection components is an IEEE802.1d bridge.

26. A method as claimed in claim 20, wherein a network layer protocol supported by the network layer bridge is the Internet Protocol.

27. A method as claimed in claim 20, wherein the memory is adapted to store data link layer addresses for said data link layer with dynamic addressing which include NodeID and FIFO.

28. A method as claimed in claim 20, wherein the network addressing to read the UID of nodes on the network segment to reassociate the network layer address with the corresponding data link layer address for each such node which is capable of supporting Internet Protocol on the network segment and which is known to the network layer bridge.

29. A method as claimed in claim 20, wherein the network layer bridge is adapted after a bus reset on the network segment with data link layer dynamic bridge is adapted to determine whether an IP packet is too large to be transmitted across the bridge on to a receiving network segment, and to fragment the IP packet to a plurality of packet fragments of sufficiently small size for transmission on to the receiving network segment.

* * * * *